US006008816A

United States Patent [19]

Eisler et al.

[11] Patent Number: 6,008,816

[45] Date of Patent: Dec. 28, 1999

[54] METHOD AND SYSTEM FOR MANAGING COLOR SPECIFICATION USING ATTACHABLE PALETTES AND PALETTES THAT REFER TO OTHER PALETTES

[75] Inventors: Craig G. Eisler; G. Eric Engstrom, both of Kirkland, Wash.

[73] Assignee: Microsoft Corporation, Redmond, Wash.

[21] Appl. No.: 08/641,016

[22] Filed: Apr. 25, 1996

[51] Int. Cl.$^{6}$ .......... G06T 5/00

[52] U.S. Cl. .......... 345/431; 345/186; 345/199; 345/507

[58] Field of Search .......... 345/186, 199, 345/431, 507, 185

[56] References Cited

U.S. PATENT DOCUMENTS

| | | | |
|---|---|---|---|
| 4,979,032 | 12/1990 | Alessi et al. | 358/76 |
| 5,065,234 | 11/1991 | Hung et al. | 358/80 |
| 5,233,684 | 8/1993 | Ulichney | 345/431 |
| 5,235,677 | 8/1993 | Needle et al. | 345/431 |
| 5,384,902 | 1/1995 | Carlsen | 345/431 |
| 5,394,518 | 2/1995 | Friedman et al. . | |
| 5,394,523 | 2/1995 | Harris . | |
| 5,412,766 | 5/1995 | Pietras et al. | 345/431 |
| 5,428,722 | 6/1995 | Marsh et al. . | |
| 5,455,599 | 10/1995 | Cabral et al. . | |
| 5,459,486 | 10/1995 | Iverson et al. | 345/153 |
| 5,537,579 | 7/1996 | Hiroyuki | 395/500 |
| 5,572,235 | 11/1996 | Mical et al. | 345/150 |
| 5,642,137 | 6/1997 | Kitazumi | 345/199 |
| 5,664,080 | 9/1997 | Lucas et al. | 345/431 |
| 5,734,368 | 3/1998 | Meyers et al. | 345/155 |

OTHER PUBLICATIONS

Implementing Games for Windows Using the WinG API and the WaveMix DLL, James Finnegan, Microsoft Systems Journal, pp. 61–81, Jan., 1995.

*Primary Examiner*—Mark R. Powell
*Assistant Examiner*—Motilewa Good-Johnson
*Attorney, Agent, or Firm*—Klarquist Sparkman Campbell Leigh & Whinston, LLP

[57] ABSTRACT

A method for managing color specification in a display device interface for a computer. The display device interface includes services to create palettes, to associate palettes with on or off screen surfaces such as sprites, overlays and textures, and to manipulate the entries in palettes. A method for managing color specification includes creating a palette that stores indices to another palette.

14 Claims, 11 Drawing Sheets

METHOD AND SYSTEM FOR MANAGING COLOR SPECIFICATION USING ATTACHABLE PALETTES AND PALETTES THAT REFER TO OTHER PALETTES

This application is related to the following co-pending U.S. patent applications, which are commonly assigned:

Resource Management For Multimedia Devices In A Computer by Craig G. Eisler and G. Eric Engstrom, filed on Apr. 25, 1996 as application Ser. No. 08/396,522;

Method And System For Flipping Images In A Window Using Overlays by G. Eric Engstrom and Craig G. Eisler, filed on Apr. 25, 1996 as application Ser. No. 08/639,333;

Method And System In Display Device Interface For Managing Surface Memory by G. Eric Engstrom and Craig G. Eisler, filed on Apr. 25, 1996 as application Ser. No. 08/641,015;

Multimedia Device Interface For Retrieving And Exploiting Software And Hardware Capabilities by G. Eric Engstrom and Craig G. Eisler, filed on Apr. 25, 1996 as application Ser. No. 08/641,017;

Display Device Interface Including Support For Generalized Flipping Of Surfaces by Craig G. Eisler and G. Eric Engstrom, filed on Apr. 25, 1996 as application Ser. No. 08/641,014; and System For Enhancing Device Drivers by Craig G. Eisler and G. Eric Engstrom, filed on Apr. 25, 1996 as application Ser. No. 08/637,530.

These applications are hereby incorporated by reference.

TECHNICAL FIELD

The invention relates to the process of color specification in computer graphics applications, and more specifically relates to color tables or palettes.

BACKGROUND OF THE INVENTION

In computer graphics, a color image typically comprises a two dimensional array of binary color values, called a pixmap. The elements in the array are sometimes referred to as pixel values or "pixels," which represent the individual picture elements of an image. To display these pixels, a display controller typically reads the elements in an array, converts them into values compatible with the display monitor and controls the monitor's display of the image. For example, a display screen on a raster display device is comprised of an array of pixels. In the process of displaying an image on the monitor, the raster scans across the display screen energizing the individual picture elements with an electron beam based on the color values for each pixel.

A color table or "palette" is often used to compress a color image. Rather than store color values for each pixel, the pixmap can store indices into a color table instead. The entries in the color table store color values, which represent the available color choices for the pixmap or pixmaps that refer to the table. While the available color choices do not represent every conceivable color choice, they are generally deemed sufficient for the their particular application.

A color table is a form of image compression because the indices to a color table occupy fewer bits than the corresponding entries in the table. The trade off is that the color table represents a limited range of color choices. Consider the following example. One of the ways to represent the color of a pixel is to store a binary value for the Red, Green, and Blue (RGB) color components. For example, a color image can be represented with 8 bit R, G, B values. The total length of a pixel would then be 24 bits. Now, if the image is represented with only 256 colors for example, each of the 8 bit RGB values for these 256 colors can be stored in a color table having 256 entries. This color table is sometimes called an 8 bit color table because the entries to the table can be represented by an 8 bit number. Instead of storing 24 bits for each pixel in an image, each pixel can be represented by a single 8 bit index to the color table. By using the color table, the image is compressed by about a factor of 3.

While color tables provide an effective form of compression, they can also lead to difficult bookkeeping problems for application programmers. The images used in a typical game application, for example, may refer to different and inconsistent color tables. Ultimately, the display controller must have the accurate color information in order to generate the display image properly.

SUMMARY OF THE INVENTION

The invention provides an improved method of managing color palettes that is particularly adapted for a software interface to a display device, but can also be adapted for use in a variety of computer generated graphics applications. The display device interface supports a variety of palette types including palettes whose entries include indices to other palettes.

The display device interface includes a number of services that enable applications to control palettes. These services include functions to create palette structures representing palettes, to associate palettes with on or off screen pixmaps, and to manipulate the entries in palettes.

In addition to palettes with entries that store RGB or YUV color values, the display device interface can be used to create and manipulate palettes with entries that refer to another palette. For example, a palette having n entries can store indices to a second palette having m entries, where n is less than m. The second palette has entries that store color values. A specific example of this type of palette is a 4 bit on 8 bit palette. The 4 bit palette entries store indices to entries in another palette rather than color triplets.

The support for this type of palette in the display device includes a method for decoding the palette. When first pixmap associated with this type of palette is copied to a second pixmap associated with a palette that stores color values, the pixels in the first pixmap are decoded. The display device interface performs this decoding or instructs the display controller to do so. After the pixel values are copied, they are no longer indices to indices in the second palette, but instead are indices to the second palette. Another aspect of the invention is the manner in which palettes are associated with pixmaps. When an application asks the display device interface to create a palette, the display device interface creates the palette and also creates a palette structure to represent the palette. Palettes are associated with pixmaps by attaching a palette structure, representing a palette, to a surface structure representing the pixmap. To manipulate the color table of the display controller, an application can attach a palette structure to a surface structure representing the primary surface. The display device interface sets the entries in the color table of the palette to the entries of the palette attached to the primary surface.

Further features and advantages of the invention will become apparent with reference to the following detailed description and accompanying drawings.

DETAILED DESCRIPTION

Figure 1:
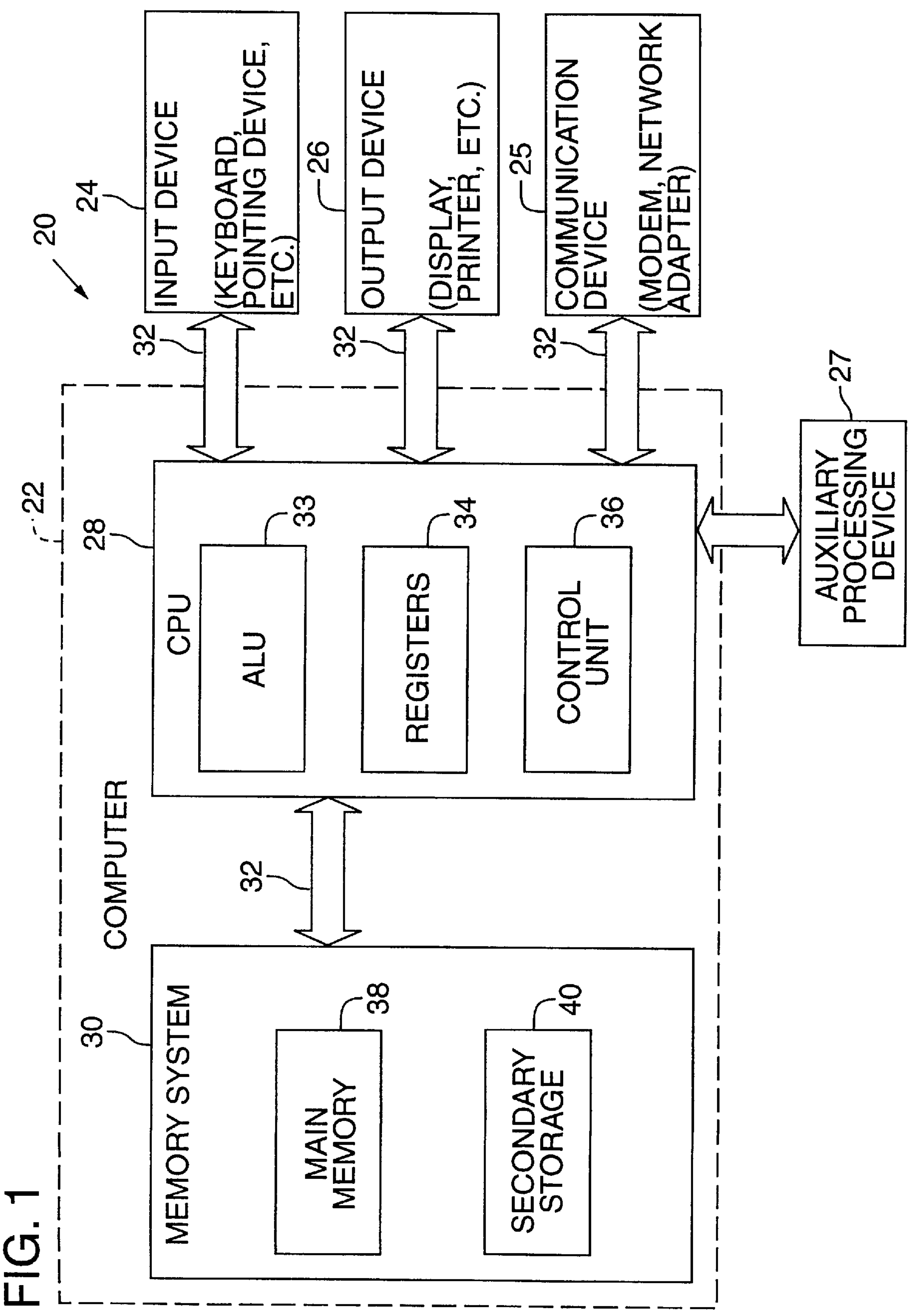
FIG. 1 is a general block diagram of a computer system in which an embodiment of the invention can be implemented.

FIG. 1 is a general block diagram of a computer system 20 in which an embodiment of the invention can be implemented. The computer system 20 includes as its basic elements a computer 22, one or more input devices 24 and one or more outputs device 26. The computer system can also include a communication device 25 and an auxiliary processing device 27.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs.

In some implementations, portions of main memory 38 may also be used for displaying images through a display device.

Input device 24 and output device 26 are typically peripheral devices connected by bus structure 32 to computer 22. Input device 24 may be a keyboard, pointing device, pen, joystick, head tracking device or other device for providing input data to the computer.

Output device 26 may be a display device, printer, sound device or other device for providing output data from the computer.

The communication device 25 can include any of a variety of peripheral devices that enable computers to communicate. For example, the communication device can include a modem or a network adapter.

The auxiliary processing device 27 refers generally to a peripheral with a processor for enhancing the performance of the computer. One example of an auxiliary processing device is a graphics accelerator card.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

Figure 2:
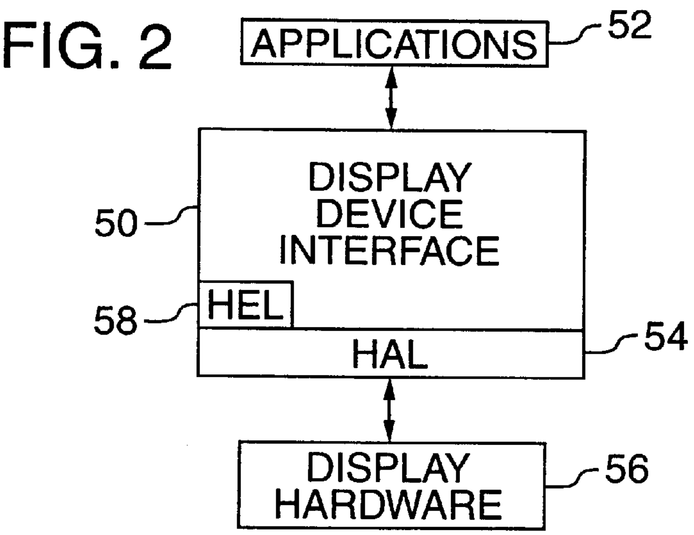
FIG. 2 is a block diagram illustrating the architecture of a display device interface 50 in which an embodiment of the invention is implemented.

FIG. 2 is a block diagram illustrating the architecture of a display device interface 50 in which an embodiment of the invention is implemented. This diagram illustrates relationships between application programs ("applications") 52, the display device interface 50, the hardware abstraction layer 54, and the display hardware 56. Applications 52 access the display hardware 56 through the display device interface 50, which serves as a device independent interface to the display hardware 56. The display device interface 50 performs parameter validation, memory management of the video memory, and bookkeeping for the interface. We describe specific features of the interface in further detail below.

The HAL (hardware abstraction layer) 54 is a hardware dependent interface to the display hardware 56. In this embodiment, the HAL includes only hardware specific code. It can be an integral part of the display hardware 56, or in the alternative, can be implemented in software on the host computer (22 in FIG. 1, for example). In the latter case, the HAL is typically implemented as a dynamic linked library (DLL). The HAL is implemented by and available from the manufacturer of the display card or chip.

The display device 50 interface can optionally include a hardware emulation layer (HEL) 58 to emulate display hardware features if they are not available in the display hardware.

The display hardware 56 includes the hardware devices within and/or coupled to the host computer that are responsible for displaying visual data including 2D and 3D rendered graphics and animation, video, text and still images.

Figure 3A:
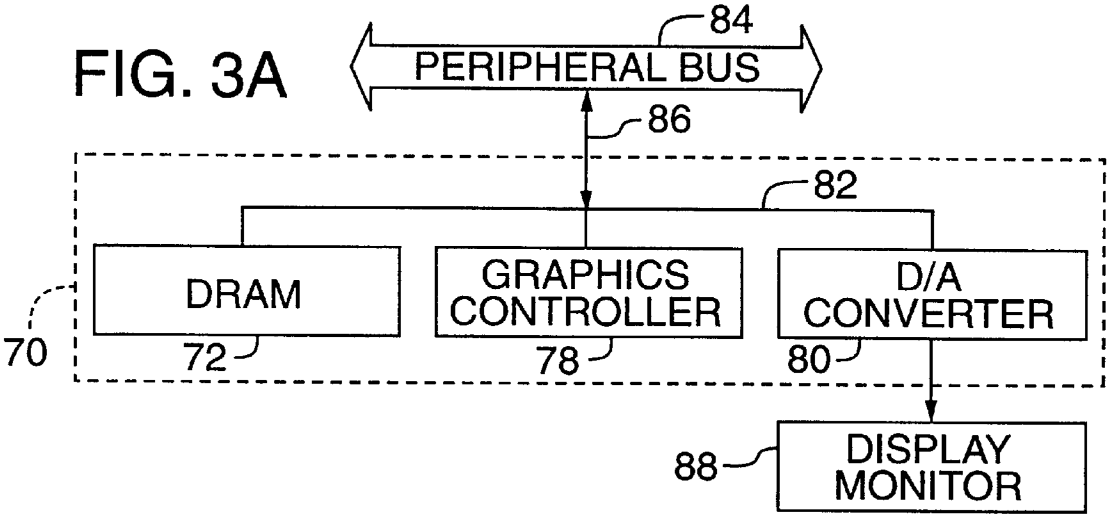
FIGS. 3A, 3B, 3C, and 3D are block diagrams showing four examples of display device architectures.
Figure 3B:
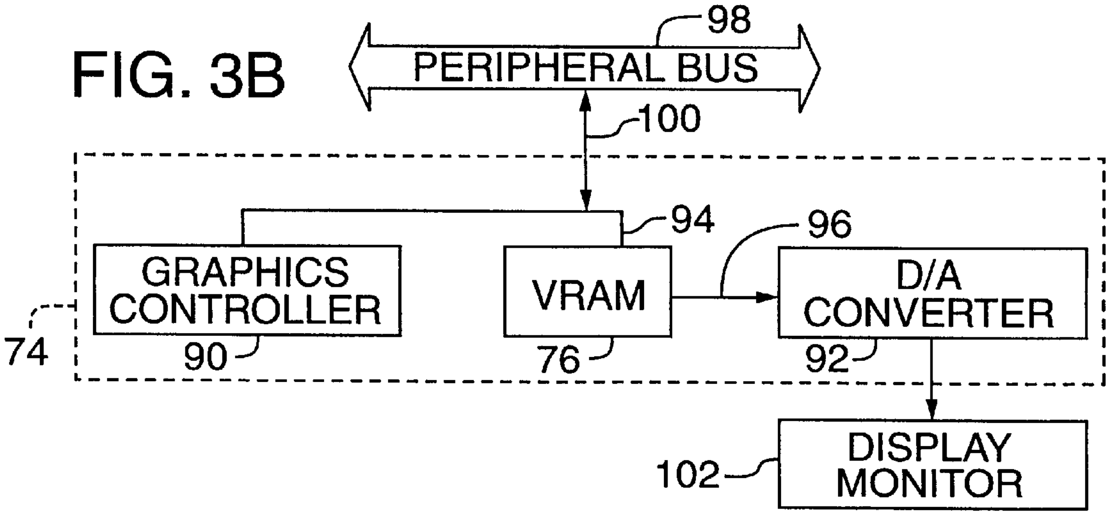
Figure 3C:
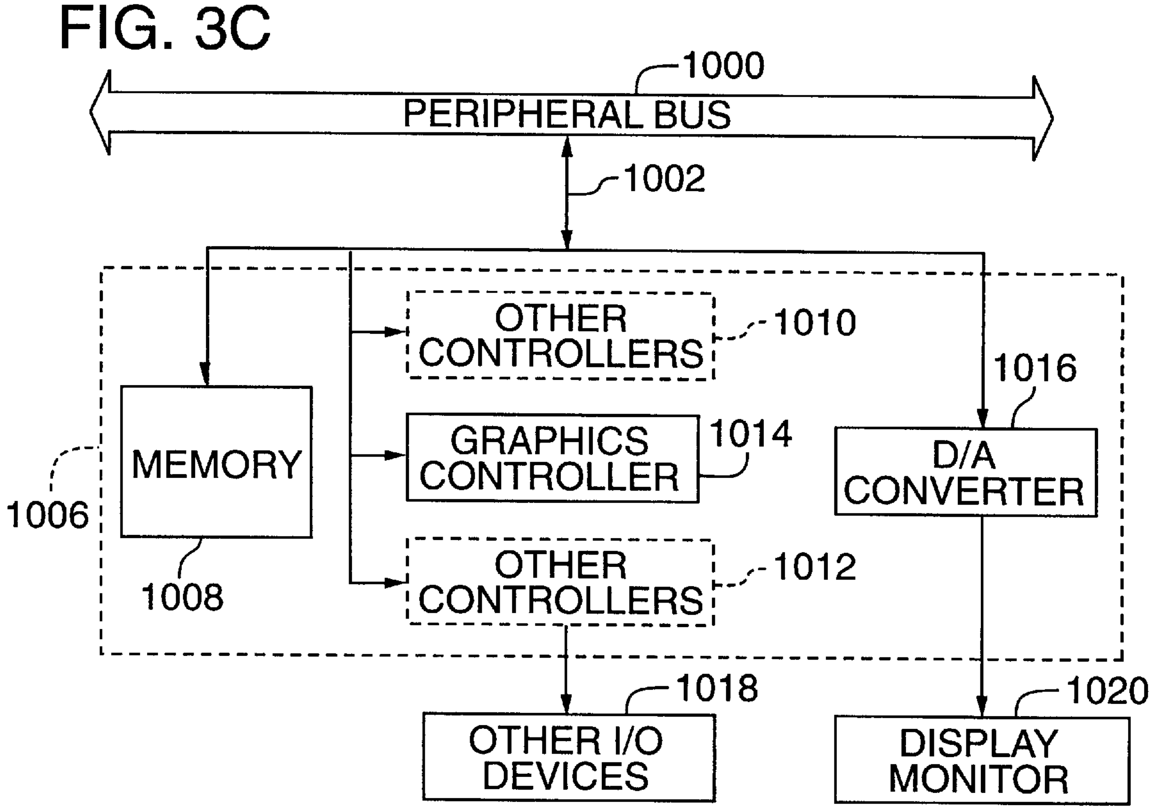
Figure 3D:
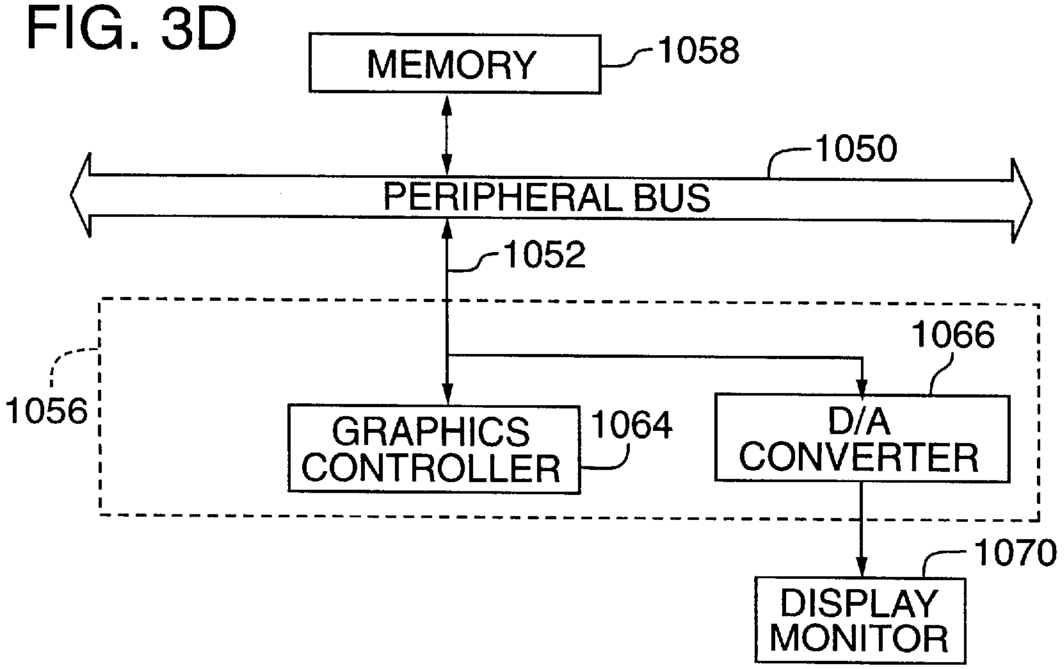

FIGS. 3A, 3B, 3C, and 3D are block diagrams showing four examples of display device architectures. FIG. 3A illustrates the architecture of a video card 70 which includes video memory implemented with DRAM (dynamic random access memory) 72. FIG. 3B illustrates the architecture of a display card 74 which includes video memory implemented with VRAM (video random access memory) 76. The video cards shown in FIGS. 3A and 3B represent only two examples of video cards with significant on board memory in common use today. For example, there are numerous types of RAM (random access memory) used on video cards. VRAM and DRAM are just two common examples. The display device interface 50, shown generally in FIG. 2, is designed to be compatible with a wide variety of display controllers whether implemented in a video card, in a video chip in the computer, or some other configuration. FIG. 3C illustrates the architecture of a multimedia card where the memory used by the display card is shared with other accelerators. FIG. 3D illustrates the architecture of a display card where the memory used by the display card is shared with the host processor. The display device interface is intended to work across any of these architectures, combinations of them, or other architectures for storing and composing pixmaps onto a display device.

The video card in FIG. 3A includes as its basic elements a graphics controller 78, video memory 72 implemented with DRAM, and a digital-to-analog converter 80. In this type of video card, each of these elements share a common bus 82. On one side, the video card is connected to a bus 84 on the host computer via a bus interface 86. On the other side, the video card is connected to a physical display device such as a display monitor 88. To generate the video display, the video card 70 receives image data and display commands from the host computer (22, for example) and controls the transfer of image data to a display monitor 88. The graphics controller 78 is responsible for acceleration and other graphics operations. When the digital-to-analog converter 80 needs to take the digitally represented image data from the DRAM and send it to the monitor, the graphics controller 78 is placed on hold until the DAC 80 finishes its task.

The video card 74 in FIG. 3B includes a graphics controller 90, video memory 76 implemented with VRAM, and a DAC 92. One significant difference between the design of this card and the card in FIG. 3B is that the graphics controller 90 and DAC 92 access the VRAM 76 through separate ports (94, 96). Coupled to a peripheral bus 98 of the host computer via a bus interface 100, the video card 74 receives image data and commands from its host and controls the display of image data stored in the video memory 76. Since the VRAM is dual ported, the DAC 92 can transfer image data to the monitor 1020 as the graphics controller 90 performs operations on other image data in the video memory.

The video card 1006 in FIG. 3C includes a graphics controller 1014, “video” memory 1008 (which is not specific to any particular technology used to implement the memory), and a DAC 1016. One significant difference between the design of this card and the card in FIG. 3B is that the graphics controller 1014 shares the “video” memory with other controllers 1010/1012 and the DAC 1016. The other controllers 1012 are sometimes used to control other peripherals, including I/O devices 1018 such as a mouse, track ball, joy stick, or sound card. There are many memory architectures for these types of cards and the device display interface supports all of them. Coupled to a peripheral bus 1000 of the host computer via a bus interface 1002, the video card 1006 receives image data and commands from its host and controls the display of image data stored in the “video” memory 1008. Arbitration between other controllers can be handled either in the HAL or by the hardware.

The video card 1056 in FIG. 3D includes a graphics controller 1064, “video” memory 1058 (which is not specific to any particular technology used to implement the memory), and a DAC 1066. One significant difference between the design of this card and the card in FIG. 3B is that the graphics controller 1064 shares the “video” memory with the host processor and the DAC 1066. There are many memory architectures for these types of cards and the device display interface supports all of them. Coupled to a peripheral bus 1050 of the host computer via a bus interface 1052, the video card 1056 receives image data and commands from its host and controls the display of the image data on the display monitor 1070. Arbitration between other peripherals on the bus can be handled either in the HAL, by the video card 1056, by the operating system, or the bus.

The display device interface 50 shown in FIG. 2 acts as an interface to display hardware such as the video cards (70, 74, 1006, 1056) illustrated in FIGS. 3A, 3B, 3C and 3D. The display device interface 50 enables applications to access video memory (72, 76, 1008, 1058, for example), including both off screen and on screen memory. It also gives the applications access to special purpose graphics hardware (78, 90, 1014, and 1064, for example), where available, to enhance performance. In cases where the underlying graphics hardware does not support a requested service, the interface can potentially emulate the service through the software in the HEL 58.

The display device interface enables applications to access and manipulate color palettes. A palette, in the context of the display device interface, can include a series of entries that hold color values such as RGB or YUV, or alternatively, can hold indices into another palette. The latter type of palette is particularly helpful in applications where a number of pixmaps, each with associated color palettes, are used to compose display images. Instead of storing color values in each color palette, some color palettes can store indices into another color palette. This feature improves color specification because it increases the chances that an application's intended color specification will match the color that the display controller actually uses to generate the display image.

For example, a four bit palette of this type can have entries that store indices into an 8 bit palette. Through the display device interface, applications can manage several 4 bit palettes of this type with entries that refer to a single 8 bit palette with 256 entries for storing the color values. Since the color values are stored in one place for several pixmaps, the application is more likely to produce consistent and accurate colors in the display image.

Figure 4A:
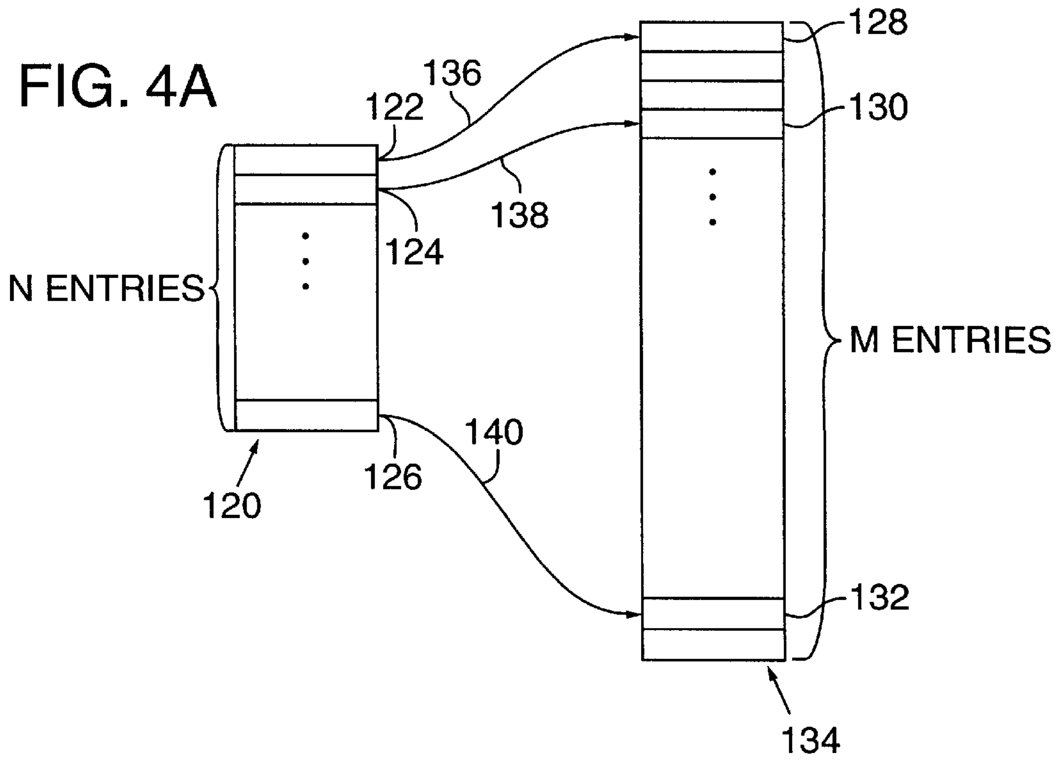
FIG. 4A is a diagram illustrating a palette with entries that store indices into a larger palette.

While we use the example of a 4 bit on 8 bit palette here, it is also possible to apply this concept more broadly. In general, a palette having n entries can hold indices into a palette having m entries, where n and m are integers and n is less than m. FIG. 4A is a diagram illustrating a palette 120 with entries (122–126) that store indices to entries (128–132, for example) of a larger palette 134. The indices stored in the smaller palette are graphically represented by the arrows 136–140 from entries in the first palette to entries in the second palette. The smaller palette has an integer number of entries n, and the larger palette has an integer number of entries, m, where n is less than m.

In the typical case, the value of n and m are powers of 2, and the color indices in an associated pixmap are binary numbers. For example, a 4 bit palette refers to a palette where the indices are represented using a 4 bit binary number. A 4 bit palette typically has 16 entries ($2^4$).

However, the number of entries in a palette does not have to be a power of 2.

This type of palette provides a layer of indirection for the pixmaps associated with it. This means that the palette entry refers to an entry in another palette, rather than storing a color value or values.

Figure 4B:
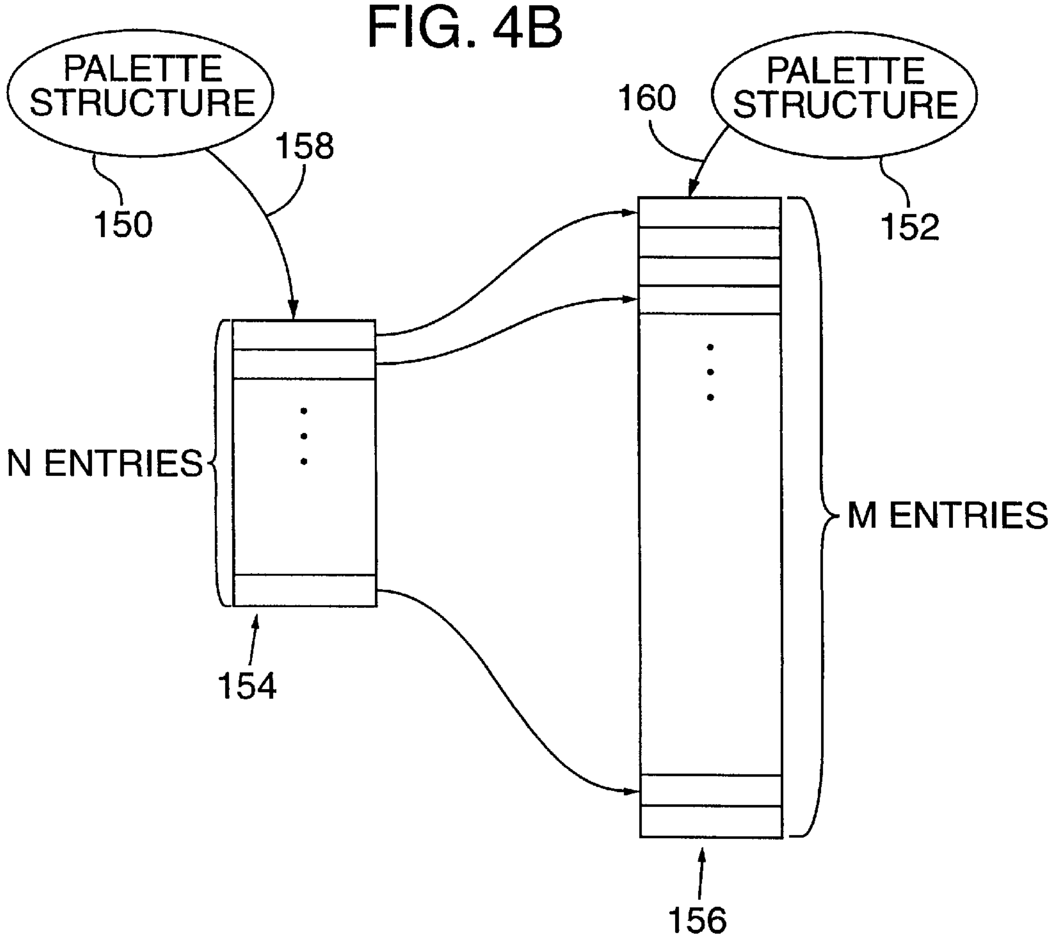
FIG. 4B is a diagram illustrating the relationship between the palettes in FIG. 4A and associated palette structures.

The display device interface enables applications to manipulate the palettes of the type shown in FIG. 4A through a palette structure. FIG. 4B is a diagram illustrating the relationship between palette structures 150, 152 and their associated palettes 154, 156. The palette structure includes a reference pointer 158, 160 to the underlying palette, which can be stored in system memory or video memory. The palette structure 150, 152 can also store other information about the palette such as its type, whether the entries have indices or actual color values, the number of entries, etc.

The display device interface, illustrated in FIG. 2, creates a palette structure and associated palette in response to a request from an application. The display device interface also includes services to get and set entries in the palette. To create a palette, an application or other process using the display device interface invokes a create palette service and specifies the type of the palette. The display device allocates memory for the palette and gives the application a reference to the palette structure. The application can then manipulate the palette through the palette structure. For example, it can set and get entries from the palette by using the get and set entry services and specifying the palette structure that it wants to manipulate.

Figure 5A:
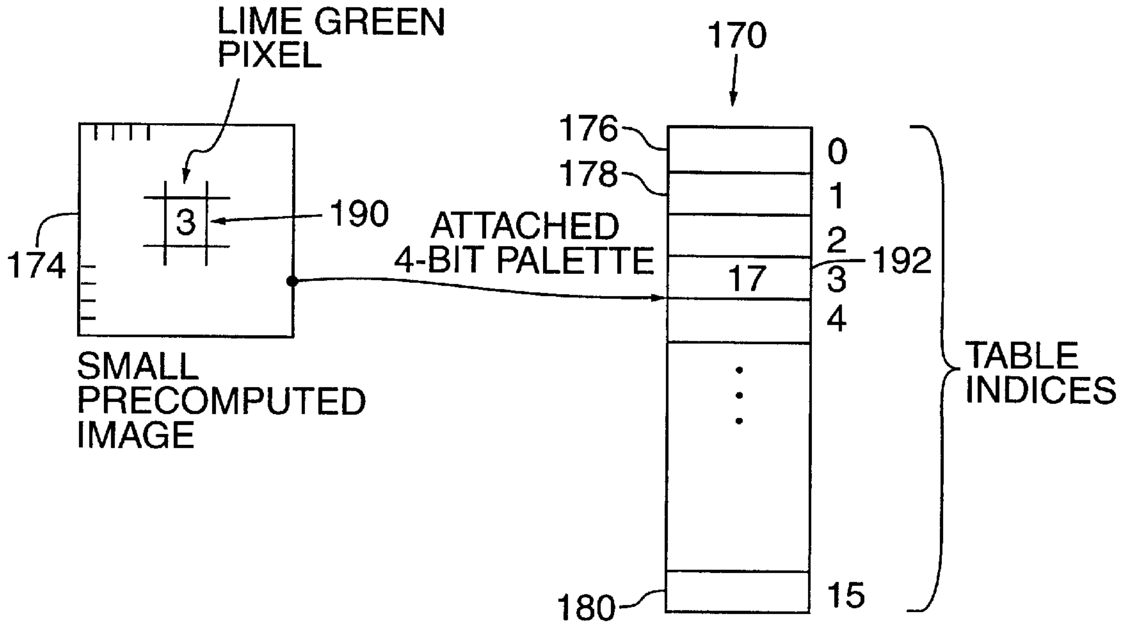
FIGS. 5A and 5B are diagrams illustrating an example of a palette with entries that store indices to another palette.
Figure 5B:
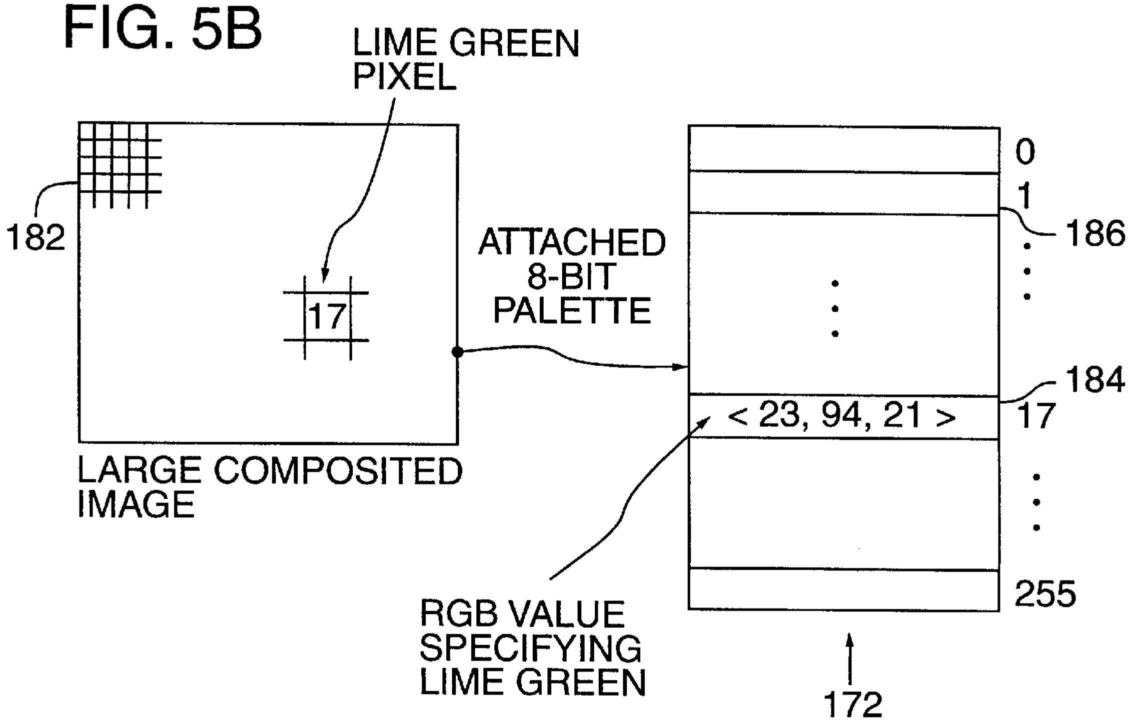

FIGS. 5A and 5B are diagrams illustrating an example of a palette 170 with entries that store indices to another palette 172. FIG. 5A illustrates the relationship between a small, precomputed pixmap 174 and a palette 170 with entries (176–180) that contain indices into a 8 bit palette 172 shown in FIG. 5B. FIG. 5B illustrates the relationship between a larger, composited image 182 and the 8 bit palette 172 with entries (184–186) that store RGB color values. In this example, the precomputed pixmap 174 is comprised of 4 bit values, which are indices into a 4 bit palette 170. In turn, the entries in the 4 bit palette 170 store indices into an 8 bit palette, which serves as the palette for the large, composited image.

For the purpose of this example, assume that there is a lime green pixel 190 in the precomputed pixmap 174, and that the RGB values for the color lime green are stored as the entry number 17 (184) in the 8 bit palette 172 as shown in FIG. 5B. The palette associated with the small pixmap does not have an entry with the RGB values of the lime green color, but instead it has an entry (3, in this example) 192 that stores the entry number (17) of the 8 bit palette. To represent a lime green pixel in the small image, the pixmap stores an index to entry number 3, which corresponds to the entry storing the number 17. For this type of palette, each of the entries of the smaller palette store indices to a color value stored in a larger palette.

In one implementation of the display device interface, a palette is associated with a pixmap by "attaching" the palette structure to another structure representing a region in memory that holds the pixmap. This region in memory is generally referred as surface memory. A surface refers an array of image data. In the typical case, a surface is a pixmap, but it can also be an array of alpha or z values.

Pixmap surfaces can be classified as either "on" or "off" screen and can represent a variety of types of images. For instance, pixmap surfaces in this implementation of the display device interface include a primary surface, or surfaces representing overlays, sprites or texture maps. The "primary surface" represents the pixmap that is currently visible on a display monitor. The primary surface resides at a region in video memory that the display controller is reading and converting to generate a display screen. An overlay refers to a pixmap that is superimposed or combined with another pixmap, such as the primary surface. A sprite typically refers to an image smaller than the size of the display screen that is composited with another pixmap, usually the primary surface. A texture map is a pixmap that is mapped to the surface of a three dimensional (3D) graphical model. Texture maps or "textures" are used in 3D graphics rendering operations to represent fine surface detail on a graphical object. While we have listed a variety of types of pixmaps, this list is not intended to be exhaustive, but merely exemplary of the types of pixmaps which a palette can be associated with.

Figure 6A:
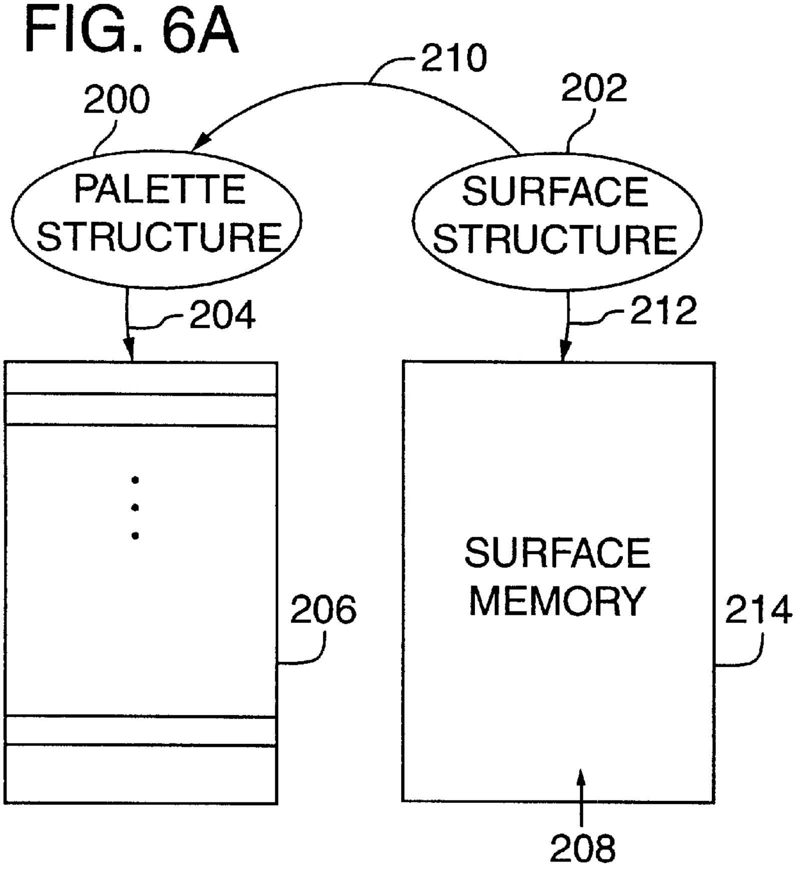
FIGS. 6A and 6B diagrams illustrating how a palette structure can be associated with a surface structure or surfaces structures representing surface memory.

FIG. 6A illustrates an example of how a palette structure 200 can be associated with or "attached" to a surface structure 202. As shown in this example, the palette structure 200 includes a reference pointer 204 to the palette 206 that it represents. The palette 200 is associated with a surface 208 by the attachment link 210 between the palette structure 200 and a surface structure 202 representing the surface. The surface structure 202 manages a surface by maintaining a reference pointer 212 to the surface memory 214 holding the surface and by maintaining the attachment link 210 to the associated palette structure 200.

Figure 6B:
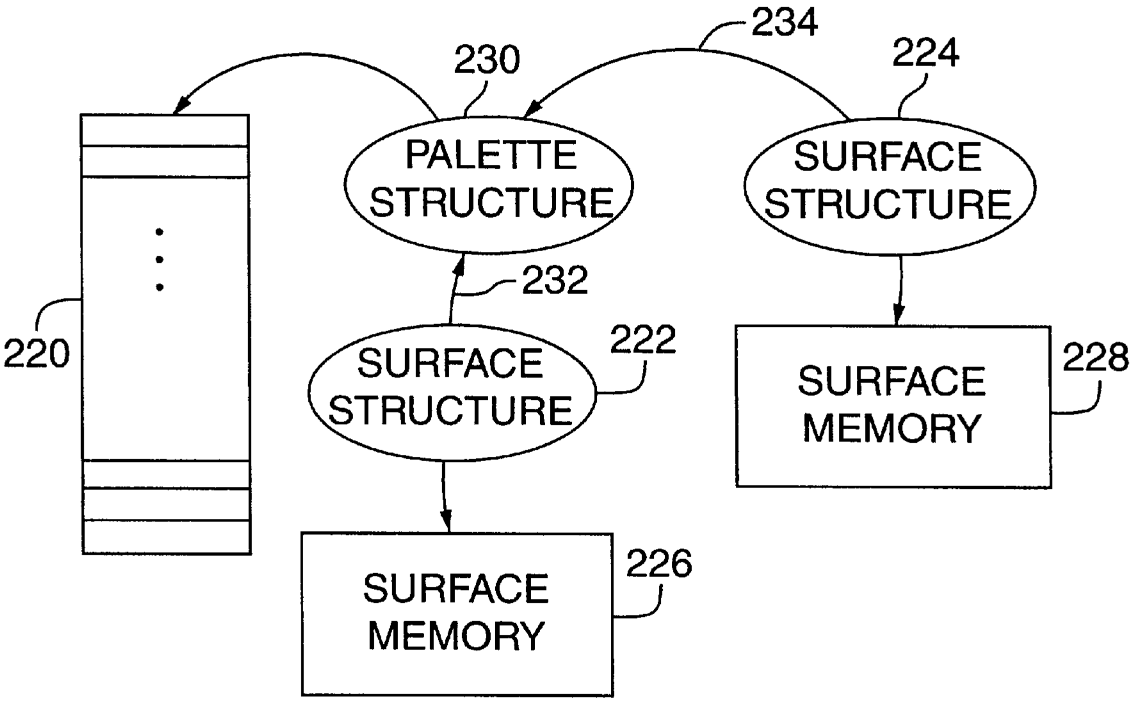

FIG. 6B is a diagram illustrating how a palette 220 can be attached to different surfaces. In this example, two surface structures 222, 224, representing different regions in surface memory 226, 228, refer to the same palette structure 230. The palette structure 230 is attached to both surface structures 222, 224 via attachment links 232, 234.

One embodiment of the display device interface includes a function to associate a palette with a specified surface. This function enables an application to associate a palette with a number of different surfaces. Conversely, surfaces can each have separate palettes.

The palette associated with the primary surface represents the color table of the display controller. To specify the proper color values in this color table, an application can create a palette structure, attach it to the primary surface, and then set the entries in the palette.

Another possible use of attachable palettes to attach different palettes to several surfaces that are combined into a destination surface. The entries of each of these palettes can either store color values or indices to the palette attached to the destination surface.

Figure 7:
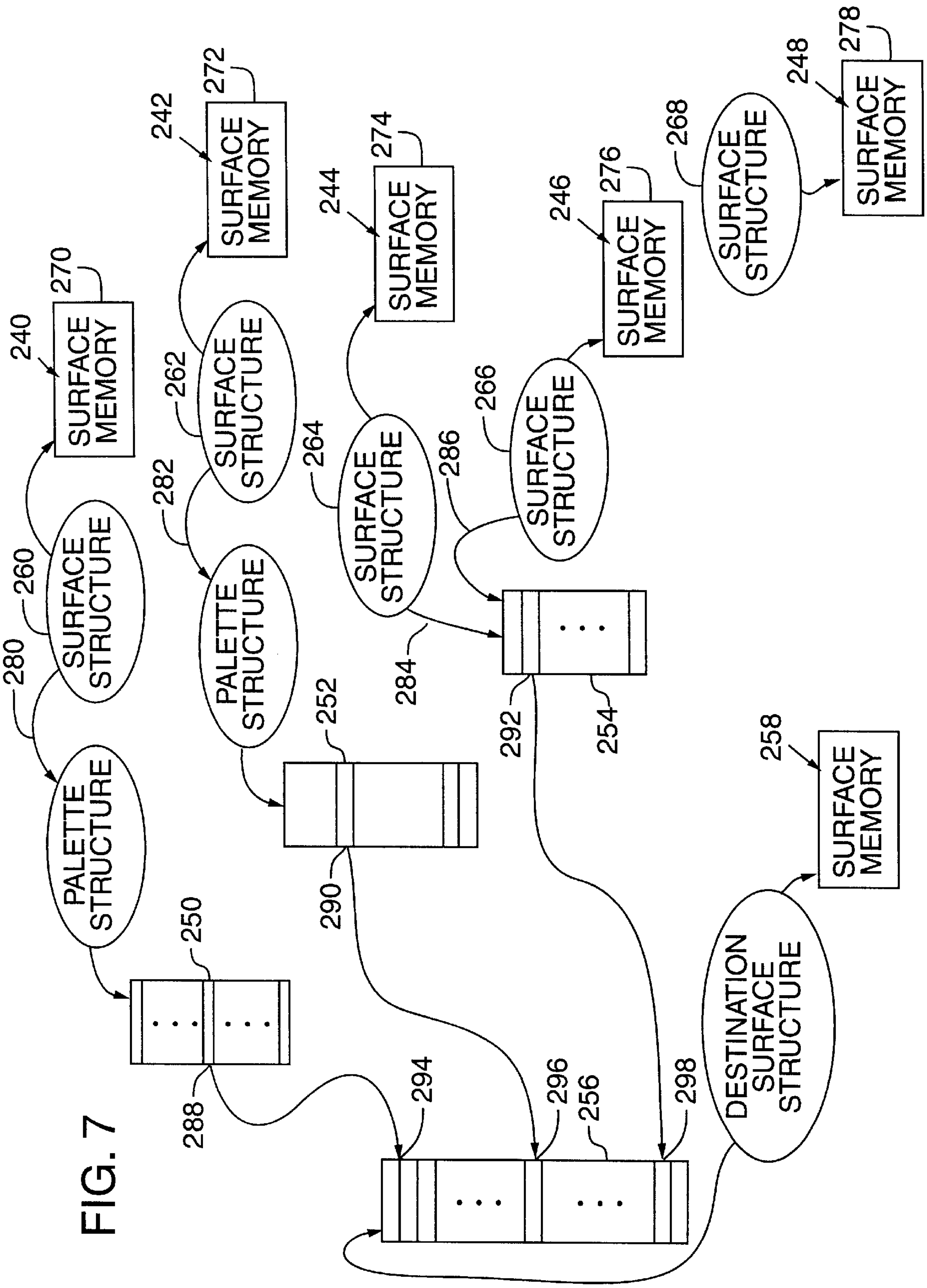
FIG. 7 is a diagram illustrating an example of surfaces associated with palettes whose entries refer to entries in the palette of a destination surface.

FIG. 7 is a diagram illustrating an example where several surfaces 240–248 have palettes 250–254 whose entries refer to entries in the palette 256 of the destination surface 258. To differentiate between surfaces, we refer to the smaller surfaces 240–248 shown in FIG. 7 as source surfaces because they will be combined with the destination surface 258 to create a new image in this example. Each of the source surfaces 240–248 is represented by a surface structure 260–268, which refers to a corresponding region in surface memory 270–278. The surface structures 260–268 of the source surfaces have attached palettes 250–254 as represented by the attachment links 280–286 in FIG. 7. Two of the surface structures 264, 266 in this example refer to the same palette 254.

The palettes 250–254 of the source surfaces have entries (288, 290, 292, for example) that store indices into the palette of the destination image. This is represented by the arrows linking the entries 288, 290, 292 of the palettes for the source surfaces to the entries 294, 296, 298 in the palette for the destination image.

One of the source surface structures (268) does not have an attached palette. In one implementation, this condition is addressed by using the palette of the primary surface as a default in cases where a surface does not have an associated palette.

For the purposes of this example, assume that the source surfaces 240–248 shown in the FIG. 7 are copied into the destination image 258 using a bit block transfer. During this operation, the pixel values in the source surfaces are decoded so that they are no longer an index to an index to the palette of the destination surface, but instead, are each an index to an entry of the palette of the destination surface. If it has the capability, the display controller can decode the pixel values. Otherwise, this decoding can be emulated in software. To decode the palette entries, the display controller (or host processor in emulation mode) looks up the palette entry in the palette for the source pixmap, finds the index into the palette of the destination pixmap, and then replaces the pixel value with an index into the palette of the destination pixmap. The display controller repeats this for each of the pixel values copied to the destination image.

The functions in the display device interface described above can be implemented in a variety of different ways. Either procedural or object oriented programming approaches can be used. In one specific embodiment, palette structures and functions relating to them and are implemented using an object oriented approach.

In this embodiment, the display device interface shown in FIG. 2 is implemented as an object that represents the underlying display device hardware. There can be one instance of a display device object for every logical display device in operation. For example, a software development environment may have two monitors, one running a game using the display device interface shown in FIG. 2, and another running the development environment using an alternative display device interface such as GDI (the graphics device interface), which is part of the Windows® 95 operating system from Microsoft Corporation.

The display device object in this particular architecture owns all of the global attributes of the display device (e.g. video card) that it represents. It controls default values for the global attributes such as the color key values, color depth, resolution and the hardware's display mode. As explained further below, it also can control a default color table or palette for the primary surface.

In this implementation of the display device interface, the display device object includes a number of member functions to create additional objects, which provide services through their respective member functions. These objects include a surface object, a palette object, and a clipper object.

A surface object is a specific way to implement the surface structures described above. A surface object, therefore, represents a region in memory that holds a pixmap, an alpha buffer, or a Z buffer, for example. The member functions of the surface object provides services for managing and manipulating surfaces. As explained in further detail below, these services include functions to flip surfaces, attach or detach a surface, perform a bit block transfer, list surfaces attached to a given surface, return capabilities of the surface, return the clipper object attached to the surface, attach a palette to a surface, get an attached palette attached to a surface, etc.

A palette object is an object that represents a palette. In this implementation, a palette object becomes associated with a surface object when attached to it. Palette objects can be attached to the pixmap surfaces described above such as the primary surface, an off screen surface, a texture map, a sprite and an overlay. Each of the palette objects attached to these surfaces can represent different palettes. Alternatively, several surface objects can be attached to the same palette object.

One embodiment of the display device interface simplifies color specification for surfaces by supporting default palettes. If a surface object does not have an attached palette, it automatically defaults to the palette of the primary surface. In this architecture, the display device object controls the default palette. This feature simplifies color specification because the application does not have to specify a color palette for every pixmap used to construct the display image. The application can control color specification by setting the color palette of the primary surface. All the application needs to do is 1) create a palette object by invoking the create palette member function of the display device object; 2) set the entries of the palette using the member functions of the palette object, and 3) attach the palette object to the primary surface. When the application requests the display device interface to attach the palette object to the primary surface, the display device interface automatically sets the color table of the display controller to correspond to the palette entries of the attached palette object.

The clipper objects represent clip lists. A clipper object can be attached to any surface. In one implementation of the display device interface for a windowing environment, a window handle can be attached to a clipper object. Using the information provided by the window handle, the display device interface can update the clip list of the clipper object with the clip list of the window as the clip list for the window changes.

In order to create a surface, palette or clipper object, the application first creates an instance of a display device object. The application can then create one of these objects by invoking one of the display device object's member functions to create the object.

Figure 8:
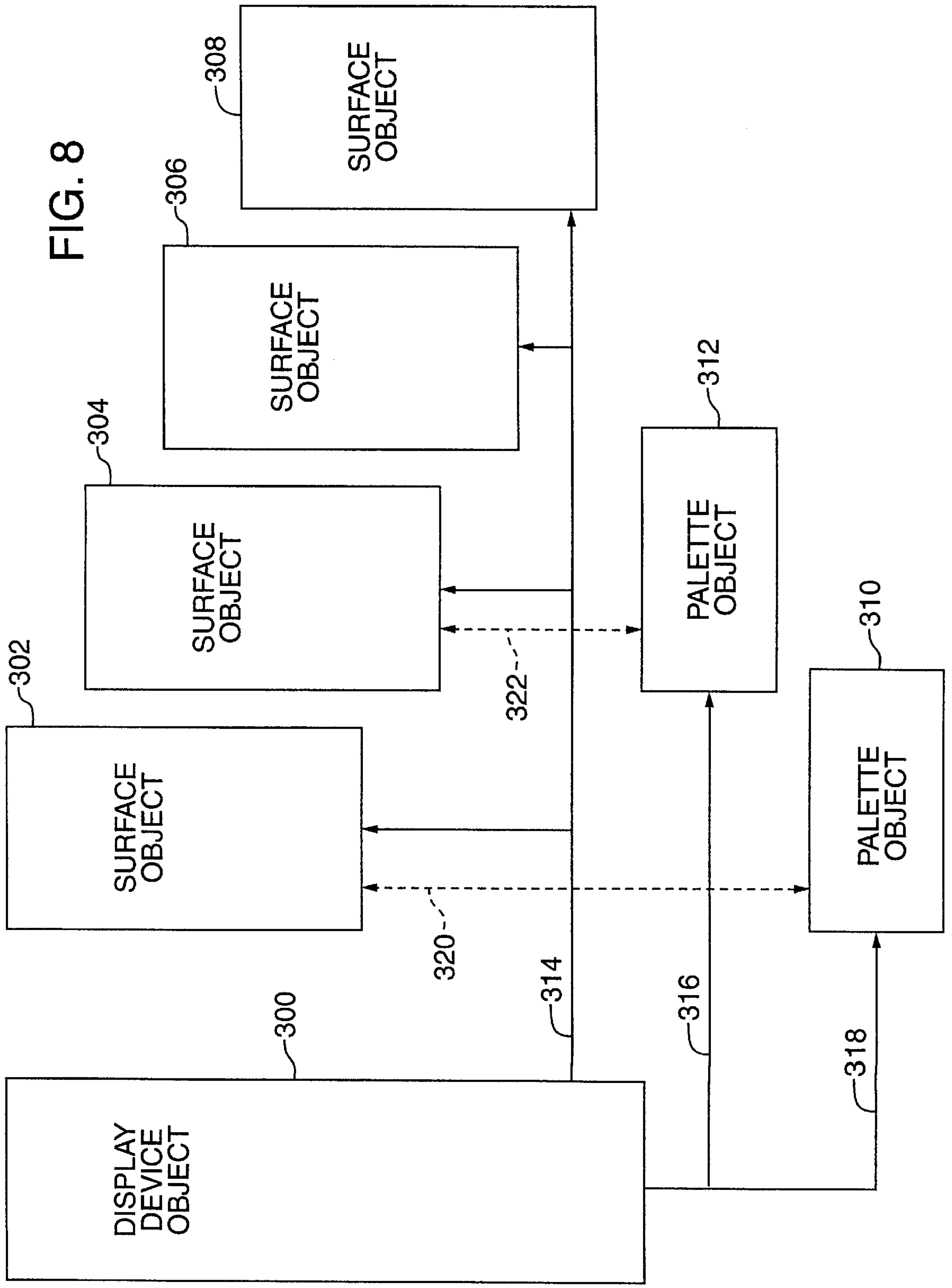
FIG. 8 is a block diagram illustrating the object architecture in one embodiment.

FIG. 8 is a block diagram illustrating the object architecture in one embodiment. The display device object 300 for a display device is the creator and owner of the surface objects 302–308 and palette objects 310–312 for that display device. It is responsible for managing all of the objects that it creates. This ownership relationship is represented by the solid arrows 314, 316, 318 from the 30 display device object 300 to its surface objects 302–308 and palette objects 310–312. The palette objects 310–312 are attached to associated surface objects via attachment links 320, 322.

To create a surface object in this architecture, the application calls the display device object's "create surface" member function. In response, the CreateSurface member function creates a surface object that represents a surface and the underlying surface memory that holds it. The member function creates a surface object with the attributes and capabilities specified by the application. If the application requests a complex surface (a surface structure including more than one surface), then the member function in this implementation creates instances of surface objects for each surface.

The application can specify the attributes of the surface object by setting fields in a surface description structure that it passes to the create surface member function.

To create a palette object in this implementation, an application invokes the CreatePalette member function of the display device object. The application specifies the type of palette that it wants by setting one or more flags and passing these flags to the display device interface. For example, these flags can specify that the palette is a 4 bit palette with color entries, an 8 bit palette with color entries, or a 4 bit palette with entries that are indices to another palette.

Figure 9:
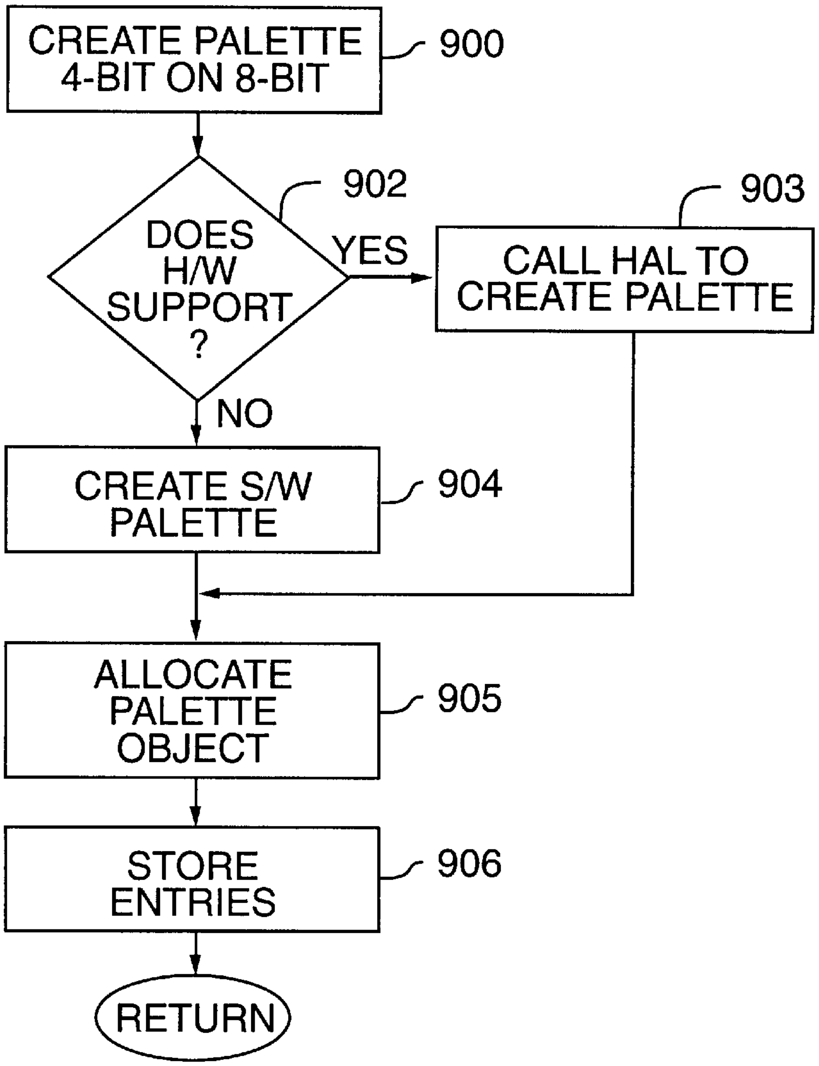
FIG. 9 is a flow diagram illustrating an implementation of creating a 4-bit on 8-bit palette.

FIG. 9 illustrates the process of creating a palette. An application requests a 4-bit on 8-bit palette be created at 900. If the hardware natively supports the creation of a 4-bit on 8-bit palette (902), the Hardware Abstraction Layer (HAL) entry in the display device driver is called to create the palette (903).

Otherwise, a software palette is created (904). Once this is done, the display device interface creates a palette object (905). Finally, the initial entries specified to the CreatePalette member function are copied to the palette 906.

The surface object includes member functions to attach a palette object to an instance of a surface object (SetPalette) and to get a palette object attached to a specified surface object (GetPalette). The SetPalette member function attaches a specified palette object to a surface object. After a palette is attached to a surface object, the surface object uses this palette for subsequent operations. When the SetPalette function is invoked, the palette change takes place immediately, without regard to refresh timing. The GetPalette function is used to get the palette structure associated with a specified surface object. If no palette has been explicitly associated with the surface object referred to in the function call, then the GetPalette function returns NULL, unless the surface object represents a primary surface or the back buffer of the primary surface. In this case, the GetPalette function returns a pointer to the system palette.

Figure 10:
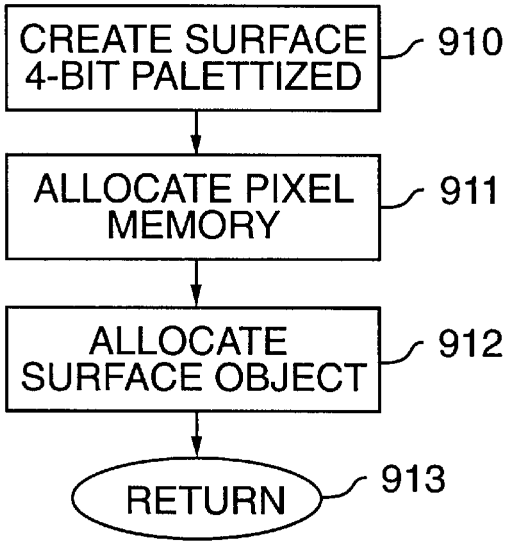
FIG. 10 is a flow diagram illustrating an implementation of creating a 4-bit palletized surface.

A surface object is created (FIG. 10) for a 4-bit palletized surface. An application calls the CreateSurface member function of the display device interface (910). The CreateSurface member function would allocate the pixel memory (911), and associate this pixel memory with the a surface object that is created (912).

Once the surface object is created and has the palette object associated with it, this surface object can have its pixel modified. An implementation of the surface object has a Lock function which provides a pointer to the pixel memory. An Unlock member function is also provided; it is called when an application is done updating the pixel memory.

Figure 11:
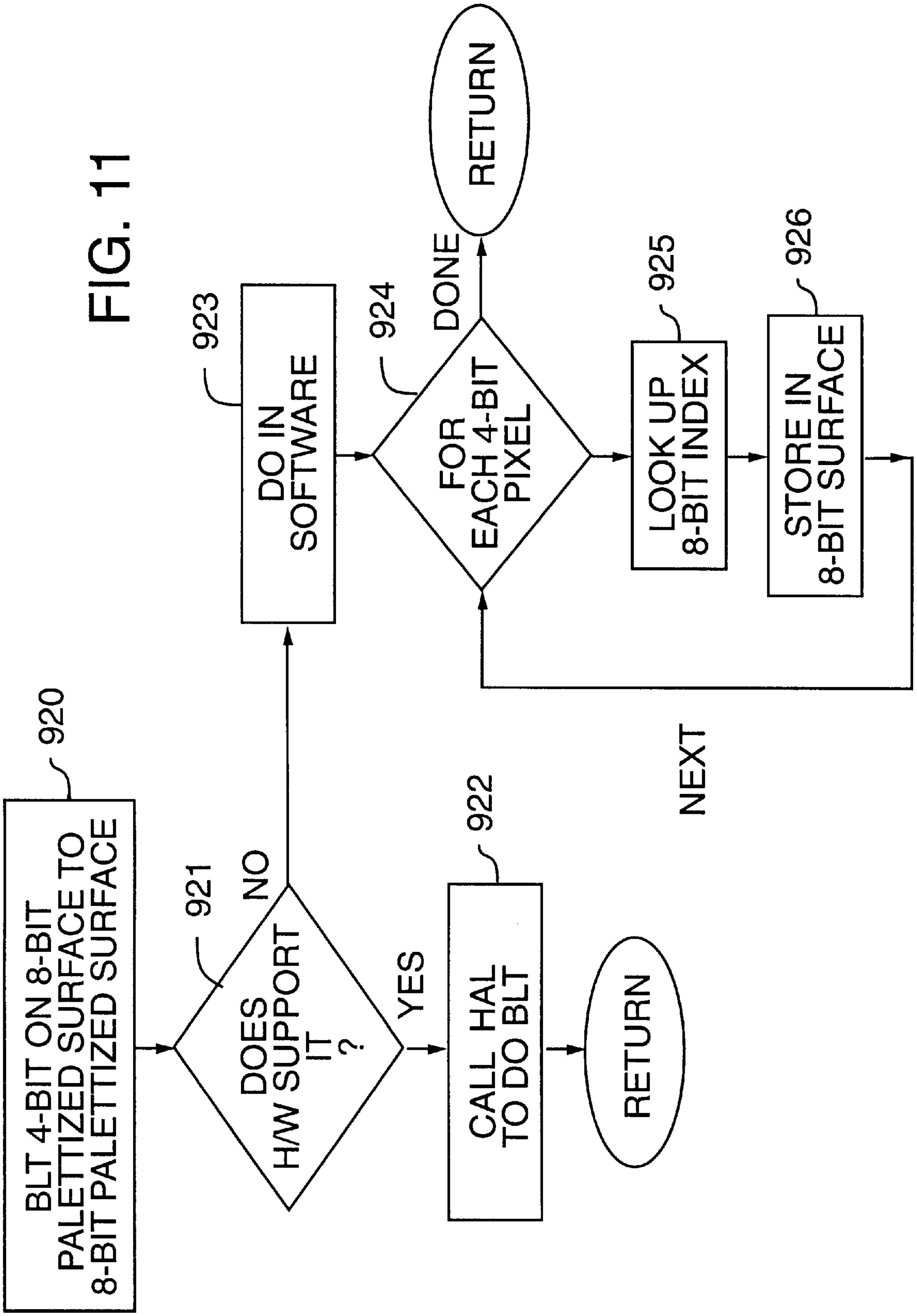
FIG. 11 is a flow diagram illustrating an implementation of copying a 4-bit on 8-bit palletized surface to an 8-bit palletized surface.

To copy the pixel memory of the 4-bit on 8-bit palletized surface to an 8-bit palletized surface, the surface object provides a Blt member function. FIG. 11 illustrates the use of the of the Blt function to do this. An application calls the source surface object's Blt member function with the source surface object and the destination surface object as parameters (1020). The source surface object represents a 4-bit on 8-bit palletized pixmap and the destination surface object represents an 8-bit palletized pixmap (1020). The Blt member function checks if the hardware supports the operation (1021); if it does, the HAL function in the display device driver is called to perform the pixel copy (1022). If the hardware does not support the operation, then a software implementation can be used (1023)

One possible implementation of software pixel copy would loop through each of the pixels in the 4-bit on 8-bit palletized surface (1024). The pixel is a 4-bit value that is used to look up the corresponding 8-bit value (1025). This 8-bit value is then stored in the 8-bit palletized surface (1026).

Figure 12:
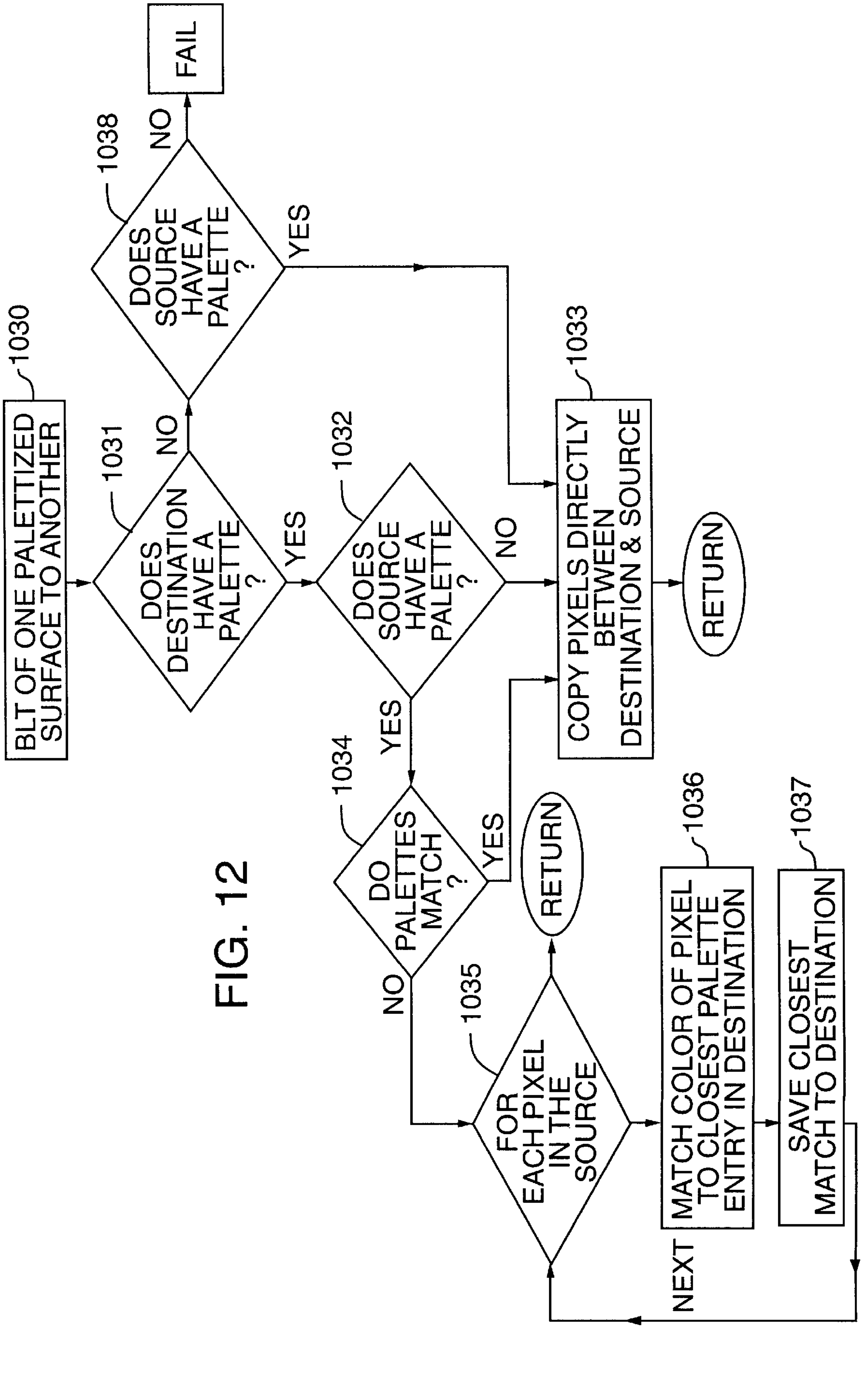
FIG. 12 is a flow diagram illustrating an implementation of copying an 8-bit palletized surface to another 8-bit palletized surface.

FIG. 12 illustrates how a copy of pixels between two palletized surfaces may be processed. FIG. 12 shows both the case where the source surface object has a palette, and the case where the source surface object has no palette. The processing begins when an application calls the Blt member function of the source surface object (1030). The Blt member function is responsible for the block copy of pixels between two pixmaps. Both the source and destination surface objects are specified to the Blt member function.

The Blt member function verifies that the destination surface object has an attached palette (1031). If it does not have an attached palette (1038), an error is returned. The Bit member function then checks if the source surface object has an attached palette (1032). If it does not have an attached palette, then the Blt member function will have the pixels copied directly from the source pixmap to the destination pixmap (1033).

If there is an attached palette, the following method may be used. First, the Blt function checks if the palettes attached to each surface are an exact match (1034). If they are an exact match, then the Blt member function will have the pixels copied directly from the source pixmap to the destination pixmap (1033). When the palettes are not an exact match, then a palette matching procedure is required. For each pixel in the source pixmap (1035), the Bit member function must look at the RGB value corresponding to the palette index and find the closest matching RGB value in the destination palette (1036). Once this match is found, the corresponding palette index is written into the destination pixmap (1037).

Palette objects have member functions to allow a consumer such as an application or other process to manipulate the underlying palette. These member functions include GetCaps, GetEntries, and SetEntries, The GetCaps function is used to get the capabilities of the palette object. To get the capabilities of a palette, an application calls this function and specifies the palette object by passing a pointer to the structure representing the palette.

Examples of the capabilities of a palette object include the type of palette such as a 4 bit, 8 bit, or a palette having entries that index another palette. Other examples of a capabilities are whether the associated palette is attached to the primary surface, and whether changes can be made to the palette that are synced with the vertical refresh rate.

The GetEntries function is used to query palette entries from a palette. To retrieve palette entries, an application can call this function and specify the desired entries by providing the starting entry and the number of entries to be retrieved from the palette.

The SetEntries function is used to change the entries in a palette. To invoke this function for specific palette entries, the application calls the function and passes the starting point of the entry to be changed, the number of entries to be changed, and the new values for the entries. In response to this call, the SetEntries function changes the specified entries immediately.

In one specific implementation, the objects in the display device architecture described above are implemented as COM interfaces. The member functions of the object types include the standard member function of a COM interface in addition to the specific functions described above. Specific examples of the member functions relating to palettes are provided in more detail in Appendix A, which is incorporated by reference.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

APPENDIX

Forming a part of the present specification is the following:

APPENDIX A

Copyright in the following material is retained by Microsoft Corporation of Redmond, Washington.

The following is an example of a member function of a display device object used to create a palette object.

```
HRESULT CreatePalette(
    LPDIRECTDRAW lpDD,
    DWORD dwFlags,
    LPPALETTEENTRY lpColorTable,
    LPDIRECTDRAWPALETTE FAR* lplpDDPalette,
    IUnknown FAR *pUnkOuter)
```

The CreatePalette member function returns DD_OK if successful, otherwise it returns one of a number of error values.

The arguments to the CreatePalette member function are as follows, lpDD
: Points to the structure representing the display device object.

dwFlags
: The flags for the implementation of the CreatePalette member function are set forth below.

DDPCAPS_4BIT
: Index is 4 bits. There are sixteen color entries in the palette table.

DDPCAPS_8BITENTRIES
: Index is onto an 8-bit color index. This field is only valid with the DDPCAPS_4BITINDEX capability and the target surface is in 8bpp. Each color entry is one byte long and is an index into destination surface's 8bpp palette.

DDPCAPS_8BIT
: Index is 8 bits. There are 256 color entries in the palette table.

DDPCAPS_ALLOW256
: This palette can have all 256 entries defined.

DDCAPS_INITIALIZE
: Indicates that this palette object should use the palette color array passed into the lpDDColorArray parameter to initialize the palette object.

lpColorTable
: Points to an array of 16 or 256 PALETTEENTRY structures that will be used to initialize this palette object.

lplpDDPallete
: Points to a pointer that will be filled in with the address of the new palette object if the create palette member function is successful.

```
HRESULT SetPalette(
    LPDIRECTDRAWSURFACE lpDDSurface,
    LPDIRECTDRAWPALETTE lpDDPalette)
```

This function attaches the specified palette object to a surface object. The surface object will use this palette for all subsequent operations.

The SetPalette member function returns DD_OK if successful, otherwise it returns one of the following error values:

| | |
|---|---|
| DDERR_INVALIDOBJECT | DDERR_INVALIDPARAMS |
| DDERR_NOEXCLUSIVEMODE | DDERR_NOT8BITCOLOR |
| DDERR_UNSUPPORTED | DDERR_GENERIC |
| DDERR_NOPALETTEATTACHED | DDERR_NOPALETTEHW |
| DDERR_SURFACELOST | |

lpDDSurface
: Points to the surface structure representing the surface.

lpDDPalette
: Pointer to the palette structure that this surface object should use for future operations.

```
HRESULT GetPalette(
    LPDIRECTDRAWSURFACE lpDDSurface,
    LPLPDIRECTDRAWPALETTE lplpDDPalette)
```

The GetPalette function is used to get the palette structure associated with this surface. If no palette has been explicitly associated with this surface then it returns NULL for the associated palette, unless this is the primary surface or a back buffer to the primary surface, in which case it returns a pointer to the system palette if the primary surface is in 8bpp mode.

This function returns DD_OK if successful, otherwise it returns one of the following error values:

| | |
|---|---|
| DDERR_INVALIDOBJECT | DDERR_INVALIDPARAMS |
| DDERR_SURFACELOST | DDERR_UNSUPPORTED |
| DDERR_GENERIC | DDERR_NOEXCLUSIVEMODE |
| DDERR_NOPALETTEATTACHED | |

lpDDSurface
: Points to the surface structure representing the surface.

lplpDDPalette

APPENDIX A-continued

Points to a pointer to a palette structure. This pointer will be filled in with the address of the palette structure associated with this surface. This will be set to NULL if there is no DirectDrawPalette associated with this surface.

The palette object can include a number of member functions to allow a consumer of a palette object to manipulate the underlying palette. Some of these member functions are described in further detail below.

```
HRESULT GetCaps(
        LPDIRECTDRAWPALETTE lpDDPalette,
        LPDWORD lpdwCaps)
```

This function is used to get the capabilities of the palette object specified in an argument to the call with a pointer to the palette structure representing the palette.

The GetCaps function returns DD_OK if successful, otherwise it returns one of the following error values:

DDERR_INVALIDOBJECT DDERR_INVALID PARAMS lpDDPalette

Points to the DirectDrawPalette structure returned to the application when the DirectDrawPalette was created.

lpdwCaps

Flags for lpdwCaps.

DDPCAPS_4BIT DDPCAPS_8BITENTRIES
DDPCAPS_8BIT DDPCAPS_ALLOW256
DDPCAPS_PRIMARYSURFACE DDPCAPS_PRIMARYSURFACELEFT
DDPCAPS_VSYNC

The meaning of these flags is set forth below.

DDPCAPS_4BIT

This flag indicates that the index is 4 bits, and that there are sixteen color entries in the palette table.

DDPCAPS_8BITENTRIES

This flag indicates that the index is onto an 8 bit color index. This field is only valid with the DDPCAPS_4BIT capability and the target surface is in 8bpp. Each color entry is one byte long and is an index into destination surface's 8bpp palette.

DDPCAPS_8BIT

This flag indicates that the index is 8 bits, and that there are 256 color entries in the palette table.

DDPCAPS_ALLOW256

This flag indicates that the palette can have all 256 entries defined.

DDPCAPS_INITIALIZE

This flag indicates that this palette should use the palette color array passed into the lpDDColorArray parameter to initialize the palette object.

DDPCAPS_PRIMARYSURFACE

This palette is the one attached to the primary surface. Changing this table has immediate effect on the display unless DDPAL_VSYNC is specified and supported.

DDPCAPS_PRIMARYSURFACELEFT

This palette is the one attached to the primary surface left. Changing this table has immediate effect on the display unless DDPAL_VSYNC is specified and supported.

DDPCAPS_VSYNC

This palette can have modifications to it synced with the monitors refresh rate.

```
HRESULT GenEntries(
        LPDIRECTDRAWPALETTE lpDDPalette,
        DWORD dwFlags,
        DWORD dwBase,
        DWORD dwNumEntries,
        LPPALETTEENTRY lpEntries )
```

The GetEntries function is used to query palette values from a palette object.

It returns DD_OK if successful, otherwise it returns one of the following error values:

DDERR_INVALIDOBJECT DDERR_INVALIDPARAMS
DDERR_NOTPALETTIZED lpDDPalette

Points to the palette structure returned to the application when the CreatePalette member was called.

dwFlags

Not used at this time. Must be zero.

dwBase

This is the start of the entries that should be retrieved sequentially.

dwNumEntries

This flag indicates how many palette entries that an Entries structure (referred to by lpEntries) can hold. The colors of each palette entry will be returned in sequence starting from dwStartingEntry and proceeding through dwCount-1.

lpEntries

A pointer to the palette entries. The palette entries are one byte each if the DDPCAPS_8BITENTRIES field is set and four bytes otherwise. Each field APPENDIX A-continued

```
        is a color description.
DWORD Release(
        LPDIRECTDRAWPALETTE lpDDPalette)
                This function reduces the interface reference count on the palette object
created by and returned from the CreatePalette member. When the reference count
reaches zero, the object will be freed.
                This function returns the reference count of the object if successful, or
zero if an error occurs.
lpDDPalette
        Points to the Palette structure returned to the client when the CreatePalette
        member was called to create the palette object.
HRESULT SetEntries(
        LPDIRECTDRAWPALETTE lpDDPalette,
        DWORD dwFlags,
        DWORD dwStarting Entry,
        DWORD dwCount,
        LPPALETTEENTRY lpEntries)
                This function is used to change entries in a palette. The changes will be
performed immediately. The palette must be attached to a surface using the
SetPalette member before SetEntries can be used in this implementation.
                The SetEntries function returns DD_OK if successful, otherwise it
returns one of the following error values:
DDERR_INVALIDOBJECT                     DDERR_INVALIDPARAMS
DDERR_UNSUPPORTED                       DDERR_NOTPALETTIZED
DDERR_NOPALETTEATTACHED
lpDDPalette
        The pointer to the palette structure returned to the client when the
        CreatePalette member was called to create the target palette.
dwFlags
        Not currently used.
dwStartingEntry
        The first entry to be set.
dwCount
        The number of palette entries to be changed.
lpEntries
        The palette entries are one byte each if the DDPCAPS_8BITENTRIES field
        is set and four bytes otherwise. Each field is a color description
```

We claim:

1. In a computer including a processor, system memory, and a display controller, a method for managing color palettes, the method comprising:

creating a first palette having n entries representing colors that are a subset of a color space comprising k colors;

creating a second palette having m entries representing colors that are a subset of the color space, where n, m, and k are integers, m is less than k, and n is less than m;

associating the second palette with a primary surface comprising an array of indices to the second palette that are read by the display controller and converted to a display image, wherein the second palette includes plural numbered entries, and wherein an index to the second palette is a number of one of said plural numbered entries of the second palette;

copying the entries in the second palette to a color table in the display controller;

storing indices to the second palette in the first palette, wherein the colors represented in the first palette are a subset of the colors represented in the second palette, and whereby an entry in the first palette has the same format as an index to the second palette;

associating the first palette with a first pixmap, where the first pixmap comprises an array of pixels values that are indices into the first palette;

transferring at least part of the first pixmap to a specified location in the primary surface;

during the transferring step, converting pixel values in the part of the first pixmap being transferred to indices into the second palette by using the pixel values in the first pixmap as indices to look up entries in the first palette that store indices to the second palette and replacing the pixel values from the first pixmap with the indices to the second palette obtained from the entries of the first palette; and during the transferring step, storing converted pixel values into the specified location in the primary surface.

2. The method of claim 1 where n is 4, m is 8, and k is greater than 8.

3. The method of claim 1 where n is 16, m is 256, and k is greater than 256.

4. The method of claim 1 further including:

a) creating a plurality of source palettes, each representing a set of colors that is a subset of the color space, each source palette having less than m entries, where the set of colors represented by a first source palette is different from the set of colors represented by a second source palette;

b) storing indices to the second palette in each of the plurality of source palettes, wherein each of the sets of colors of the source palettes are subsets of the colors represented in the second palette, and whereby the entries of said source palettes have the same format as the indices to the second palette;

c) creating a plurality of source pixmaps, each of the plurality of source pixmaps including an array of pixel values that are indices into a corresponding source palette;

d) in response to a request to transfer a block of pixels from one source pixmap among the plurality of source pixmaps to a destination region in the primary surface, converting the pixel values in the block of pixels to indices into the second palette by using the pixel values in the source pixmap to look up entries in the corresponding source palette that store indices to the second palette and replacing the pixel values from the source image with the indices to the second palette obtained from the entries in the corresponding source palette and storing the converted pixel values in the primary surface; and e) repeating step d in response to subsequent requests to transfer a block of pixels in one of the plurality of source pixmaps to the primary surface.

5. A display device interface in a computer for controlling a display controller, wherein the display controller has a color table for storing color values and is operable to convert indexed pixel values into color values while generating a display image, the display device interface comprising:

a create surface function responsive to a function call from an application program for creating surface structures representing surface memory for storing pixmaps, the surface structures including a primary surface structure representing a region in memory that is read by the display controller to generate the display image, the surface structures further comprising one or more secondary surface structures for storing pixmaps;

a create palette function responsive to a function call from the application program for creating palette structures for representing palettes; and a set palette function responsive to a function call from the application program for attaching the palette structures created by the create palette function to a specified surface structure created by the create surface function, the set palette function operable to set entries in the color table of the display controller to entries in a palette associated with the primary surface structure.

6. In a display device interface for controlling a display controller in a computer, where the display controller has a color table for converting pixel values in a primary surface to color values while generating a display image on a display monitor from the primary surface, a computer implemented method for managing palettes comprising:

in response to a first create surface call, creating a surface structure representing the primary surface;

in response to a first create palette call, creating a first palette structure to represent a first palette having m entries;

storing color values in the m entries of the first palette;

in response to a first set palette call, specifying the first surface structure and the first palette structure, attaching the first palette structure to the surface structure and setting entries in the color table to correspond to entries in the first palette;

in response to a second create palette call creating a second palette structure to represent a second palette, where the second palette has n entries;

storing indices to the first palette in the n entries;

in reponse to a second create surface call, creating a second surface structure representing a surface;

in reponse to a second set palette call specifying the second surface structure and the second palette structure, attaching the second palette to the second surface structure; and in response to a request to bit block transfer a region in the second surface to the primary surface, decoding pixel values in the region of the second surface by using the pixel values in the second surface to look up entries in the second palette that store indices to the first palette, replacing the pixel values from the second pixmap with the indices to the first palette obtained from the entries of the second palette and placing the decoded pixel values in the primary surface, where the decoded pixel values represent indices to entries in the second palette.

7. In a display device interface for controlling a display controller in a computer, where the display controller has a color table for converting pixel values in a primary surface to color values while generating a display image on a display monitor from the primary surface, a computer implemented method for managing palettes comprising:

creating a primary surface structure to represent the primary surface;

storing a pointer to the primary surface in the primary surface structure;

in response to a request from an application to create a surface, allocating a region of pixel memory, creating a surface structure to represent the region, and storing a pointer to the pixel memory in the surface structure;

in response to a request from the application to create a palette, creating a palette, creating a palette structure to represent the palette, and storing entries in the palette;

in response to a request from the application to associate the palette with the primary surface, attaching the palette structure to the primary surface structure, and setting entries in the color table to correspond to the entries in the palette; and in response to a request to transfer pixels in the surface to the primary surface, determining whether the surface has an associated palette, and when the surface does not have an associated palette, transferring the pixels in the surface to the primary surface using the palette associated with the primary surface as a default palette.

8. A computer readable medium having instructions for performing the steps of claim 6.

9. The method of claim 5 wherein the create surface function, the create palette function, and the set palette function are device independent functions that enable the application program to control the display controller without providing device specific control information.

10. A computer readable medium having instructions for performing the steps of claim 6.

11. The method of claim 6 wherein the create surface calls, the create palette calls, and the set palette calls are device independent calls that enable an application program to control the display controller without providing device specific control information.

12. A computer readable medium having instructions for performing the steps of claim 7.

13. The method of claim 7 wherein the requests from the application are device independent function calls that enable the application to control the display controller without providing device specific control information.

14. In a computer including a processor, system memory, and a display controller, a method for managing color palettes, the method comprising:

creating a first source palette having n entries representing colors that are a first subset of a color space;

creating a second source palette having p entries representing colors that are a second subset of the color space, wherein the second subset is different from the first subset;

creating an intermediate palette having m entries representing colors that are a subset of the color space, where n, p, and m are integers, n is less than m, and p is less than m;

associating the intermediate palette with a primary surface comprising an array of indices to the intermediate palette that are read by the display controller and converted to a display image, wherein the intermediate palette includes plural numbered entries, and wherein an index to the intermediate palette is a number of one of said plural numbered entries of the intermediate palette;

copying the entries in the intermediate palette to a color table in the display controller;

storing indices to the intermediate palette in the first and second source palettes, wherein the colors represented in the source palettes are also represented in the intermediate palette, and whereby entries in the source palettes have the same format as indices to the intermediate palette;

associating the first source palette with a first pixmap, where the first pixmap comprises an array of pixels values that are indices into the first source palette;

associating the second source palette with a second pixmap, where the second pixmap comprises an array of pixels values that are indices into the second source palette;

transferring at least part of the first pixmap to a first specified location in the primary surface;

during the transferring step, converting pixel values in the part of the first pixmap being transferred to indices into the intermediate palette by using the pixel values in the first pixmap as indices to look up entries in the first source palette that store indices to the intermediate palette, and replacing the pixel values from the first pixmap with the indices to the intermediate palette obtained from the entries of the first source palette;

during the transferring step, storing converted pixel values into the first specified location in the primary surface;

transferring at least part of the second pixmap to a second specified location in the primary surface;

during the transferring step, converting pixel values in the part of the second pixmap being transferred to indices into the intermediate palette by using the pixel values in the second pixmap as indices to look up entries in the second source palette that store indices to the intermediate palette, and replacing the pixel values from the second pixmap with the indices to the intermediate palette obtained from the entries of the second source palette; and during the transferring step, storing converted pixel values into the second specified location in the primary surface.

* * * * *

UNITED STATES PATENT AND TRADEMARK OFFICE
CERTIFICATE OF CORRECTION

PATENT NO. : 6,008,816

DATED : December 28, 1999

INVENTOR(S) : Eisler et al.

It is certified that error appears in the above-identified patent and that said Letters Patent is hereby corrected as shown below:

Column 1, Lines 14-15, after "application Ser. No. 08/639,333" insert --, now U.S. Patent No. 5,850,232--.

Column 1, Lines 18-19, after "application Ser. No. 08/641,015" insert --, now U.S. Patent No. 5,801,717--.

Column 1, Lines 23-24, after "application Ser. No. 08/641,017;" insert --, now U.S. Patent No. 6,044,408--.

Column 1, Lines 27-28, after "application Ser. No. 08/641,014;" insert --, now U.S. Patent No. 5,844,569--.

Column 1, Lines 30-31, after "application Ser. No. 08/637,530" insert --, now U.S. Patent No. 5,964,843--.

Column 1, Line 61, delete "the".

Column 2, Line 41, after "When" insert --a--.

Column 2, Line 48, after "palette." begin a new paragraph at "Another aspect ...".

Column 3, Line 12, after "6B" insert --are--.

Column 3, Line 36, change "outputs device" --to output devices--.

Column 4, Line 54, change "linked" to --link--.

Column 4, Line 57, change "50 interface" to --interface 50--.

Column 5, Line 24, change "share" to --shares--.

Column 5, Line 41, change "FIG. 3B" to --FIG 3A--.

UNITED STATES PATENT AND TRADEMARK OFFICE
CERTIFICATE OF CORRECTION

PATENT NO. : 6,008,816
DATED : December 28, 1999
INVENTOR(S) : Eisler et al.

It is certified that error appears in the above-identified patent and that said Letters Patent is hereby corrected as shown below:

Column 5, Line 48, change "1020" to --102--.

Column 5, Line 66, after "1008", add --on the display monitor 1020--.

Column 8, Line 22, change "200" to --206--.

Column 9, Line 29, change "them and are" to --them are--.

Column 10, Line 48, change "the 30 display" to --the display--.

Column 11, Line 39, change "the a surface" to --the surface--.

Column 11, Line 43, change "pixel" to --pixels--.

Column 11, Line 51, change "of the of the" to --of the--.

Column 11, Line 54, change "1020" to --920--.

Column 11, Line 56, change "1020" to --920--.

Column 11, Line 58, change "1021" to --921--.

Column 11, Line 59, change "1022" to --922--.

Column 11, Line 61, change "1023" to --923.--.

Column 11, Line 64, change "1024" to --924--.

Column 11, Line 65, change "1025" to --925--.

Column 11, Line 67, change "1026" to --926--.

UNITED STATES PATENT AND TRADEMARK OFFICE
CERTIFICATE OF CORRECTION

PATENT NO. : 6,008,816
DATED : December 28, 1999
INVENTOR(S) : Eisler et al.

It is certified that error appears in the above-identified patent and that said Letters Patent is hereby corrected as shown below:

Column 12, Line 25, change "Bit" to --Blt--.

Column 12, Line 34, change "SetEntries," to --Set Entries.--.

Column 12, Line 42, change "of a" to --of--.

Appendix A, Column 15, change "HRESULT GenEntries(" to --HRESULT GetEntries(--.

Appendix A, Column 17, Line 33, change "description" to --description.--.

Claim 8, Column 20, Line 37, please change "Claim 6" to --Claim 1--.

Claim 9, Column 20, Line 38, please change "method" to --display device interface--.

Signed and Sealed this

First Day of May, 2001

*Attest:*

NICHOLAS P. GODICI

*Attesting Officer*

*Acting Director of the United States Patent and Trademark Office*